US010007902B2

(12) United States Patent
Capuozzo et al.

(10) Patent No.: US 10,007,902 B2
(45) Date of Patent: Jun. 26, 2018

(54) COMMUNICATIONS NETWORK, COMPUTER SYSTEM, COMPUTER-IMPLEMENTED METHOD, AND COMPUTER PROGRAM PRODUCT FOR PROVIDING A FEMTOCELL-BASED INFRASTRUCTURE FOR MOBILE ELECTRONIC PAYMENT (71) Applicant: Accenture Global Services Limited, Dublin (IE)

(72) Inventors: Giuseppe Capuozzo, Rome (IT); Gianluca D'Angelo, Casalnuovo di Napoli (IT); Orlando Onorato, Rome (IT); Alessandro Imparato, Rome (IT); Daniele D'Errico, Rome (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 408 days.

(21) Appl. No.: 14/172,303

(22) Filed: Feb. 4, 2014

(65) Prior Publication Data
US 2014/0236812 A1 Aug. 21, 2014

(30) Foreign Application Priority Data
Feb. 15, 2013 (EP) .................................. 13425028

(51) Int. Cl.
*G06Q 40/00* (2012.01)
*G06Q 20/30* (2012.01)
(Continued)

(52) U.S. Cl.
CPC ......... *G06Q 20/30* (2013.01); *G06Q 20/0855* (2013.01); *G06Q 20/20* (2013.01);
(Continued)

(58) Field of Classification Search
CPC ....... G06Q 20/20; H04W 12/08; H04L 63/08; G06F 15/177
(Continued)

(56) References Cited

U.S. PATENT DOCUMENTS

2007/0130085 A1 6/2007 Zhu
2009/0233583 A1 9/2009 Weiner
(Continued)

FOREIGN PATENT DOCUMENTS

CN 1448872 10/2003
CN 1835008 9/2006
(Continued)

OTHER PUBLICATIONS

Maria Gorlatova, Roberto Aiello, and Stefan Mangold, "Managing location privacy in cellular networks with femtocell deployment", 2011, 2011 International Symposium of Modeling and Optimization of Mobile, Ad Hoc, and Wireless Networks, 418-422 (Year: 2011).*
(Continued)

*Primary Examiner* — Ryan D Donlon
*Assistant Examiner* — Irene S Kang
(74) *Attorney, Agent, or Firm* — Mannava & Kang, P.C.

(57) ABSTRACT

In one aspect, the present application is directed to a communications network, a computer system, a computer-implemented method, and a computer program product for providing a femtocell-based infrastructure for mobile electronic payment. In an aspect, the communications network may include a mobile operator network; a local area in the mobile operator network, wherein the local area is under coverage of at least one femtocell; and a femtocell-based payment system connected to the mobile operator network, wherein the femtocell-based payment system is operable to provide mobile electronic payment via a user device recognized by the at least one femtocell within the local area and notified by the femtocell-based payment system.

18 Claims, 4 Drawing Sheets (51) Int. Cl.
  *G06Q 20/08* (2012.01)
  *G06Q 20/20* (2012.01)
  *G06Q 20/32* (2012.01)
  *G06Q 20/38* (2012.01)
  *G06Q 20/40* (2012.01)
  *H04W 84/12* (2009.01)
  *G06Q 20/00* (2012.01)

(52) U.S. Cl.
  CPC ....... *G06Q 20/325* (2013.01); *G06Q 20/3224* (2013.01); *G06Q 20/3255* (2013.01); *G06Q 20/3278* (2013.01); *G06Q 20/385* (2013.01); *G06Q 20/4012* (2013.01); *H04W 84/12* (2013.01)

(58) Field of Classification Search
  USPC .......................................................... 705/39
  See application file for complete search history.

(56) References Cited

U.S. PATENT DOCUMENTS

2009/0285166 A1* 11/2009 Huber ................ G06Q 20/1235
                                                     370/329
2010/0273468 A1* 10/2010 Bienas .................. H04W 24/02
                                                     455/418
2012/0011007 A1    1/2012  Blewett
2012/0084200 A1    4/2012  Triana
2012/0143759 A1*   6/2012  Ritorto, Jr. ............. G06Q 20/02
                                                     705/44
2013/0144731 A1*   6/2013  Baldwin ................ G06Q 20/20
                                                     705/17

FOREIGN PATENT DOCUMENTS

CN         1941009         4/2007
CN         101329801       12/2008
WO         WO2012073014 A1  6/2012

OTHER PUBLICATIONS

European Patent Office, "Communication Report on EP Patent Application No. 13425028.1-1955", dated Apr. 10, 2015, 6 pages.
Andy Germano: "Femtocell Based Applications and Services", Mar. 1, 2011, Retrieved from the Internet Jul. 12, 2013, 24 pages.
Terayama, Takeshi et al., "Femtocell Technologies for Providing New Services at Home", Feb. 2010, Retrieved from the Internet: URL: http://www.3g4g.co.uk/SmallCells/Femtocells_Services_1002_Docomo.pdf, retrieved on Jul. 12, 2013, p. 1-32.
European Search Report on EP application No. 13425028.1, European Patent Office dated Jul. 19, 2013.

* cited by examiner

COMMUNICATIONS NETWORK, COMPUTER SYSTEM, COMPUTER-IMPLEMENTED METHOD, AND COMPUTER PROGRAM PRODUCT FOR PROVIDING A FEMTOCELL-BASED INFRASTRUCTURE FOR MOBILE ELECTRONIC PAYMENT

The description is directed generally to femtocell-based communications networks, particularly to applications and/or systems implemented for femtocell-based communications networks, and, in particular, to a communications network, a computer system, a computer-implemented method, and a computer program product for providing a femtocell-based infrastructure for mobile electronic payment.

BACKGROUND

At present, many network operators and/or mobile network operators such as Vodafone, SFR, AT&T, Sprint Nextel, Verizon, Mobile TeleSystems, T-Mobile have launched femtocell-based systems, femtocell-based applications, and/or femtocell-based services within their mobile operator networks. For mobile network operators, a femtocell may improve coverage and/or capacity such as in local areas and/or indoors. Users may benefit from improved coverage and potentially better voice quality and/or battery life.

In telecommunications, a femtocell relates to a small, low-power access point such as a cellular base station, substantially designed for use in a small local area, particularly indoors such as at home, a shop, a supermarket, a restaurant, a gas station, an event area. A femtocell may be a subset of a smallcell, which requires a specific hardware. Therefore, existing WiFi and/or DSL routers may not be upgraded to a femtocell. A femtocell substantially connects to a mobile operator network via broadband (e.g. DSL, cable). Femtocells may be sold by a mobile network operator, to users. A femtocell is substantially the size of a residential gateway or smaller and connects to the user's broadband line (e.g. DSL, cable). Integrated femtocells, which may include both a router and a femtocell, are also available.

Once plugged in, a femtocell may connect to the mobile operator network and provides extra coverage and/or capacity. From a user's perspective, it is plug-and-play there is no specific installation and/or technical knowledge required so that anyone can install a femtocell in a specific local area. Having a subscriber system, a user may declare which mobile phone numbers are allowed to connect to the plugged-in femtocell. This may be done via a web interface provided at the mobile network operator through the femtocell. When user devices operating under at least one of the registered numbers arrive under coverage of the femtocell, they switch over from a macrocell to the femtocell automatically.

A macrocell is a cell in a mobile operator network that provides radio coverage served by a high power cellular base station (also referred to as a tower).

A femtocell may allow service providers to extend service coverage indoors and/or at the cell edge, for example where access would otherwise be limited and/or unavailable.

Users and/or mobile network operators may benefit from femtocells. Femtocells may provide improved cellular coverage, capacity and/or applications for local areas including homes and/or enterprises as well as metropolitan and/or rural public spaces. Such applications are referred to as femtocell-based applications and/or femtocell-based systems. Femtocell-based systems substantially allow user devices and/or network applications to benefit from the cheap and fast data connections and location-awareness provided by femtocells. In femtocell-based systems, a femtocell may act as a portal to in-home services and/or automation with high-bandwidth connected-home applications and thereby delivering presence, context, and/or location in such applications. Examples of femtocell-based applications and/or systems may include home security with secure home access, virtual home phones, virtual fridge notes, etc.

Femtocells may provide offload of Radio Access Network (RAN) Mobile: User may use femtocells as an alternative to the macro radio network because the signal is stronger at their point of use (e.g. in a business establishment such as a shop, a restaurant, an office, an local area, etc). Femtocells enable a new breed of mobile services that exploits the technology's ability to detect presence, connect and/or interact with existing networks. Femtocells emit low levels of radio waves, also known as Radio Frequency (RF) electromagnetic fields in use.

In order to speed up system and/or application development the Small Cell Forum has published a series of application programming interfaces, APIs, which address issues related to lack of standardization among femtocells. Femtocell standards for UMTS (release 8); LTE (release 9), CDMA, and/or WiMac are developed.

There is an upcoming interest and/or requirement in local areas requesting for mobile electronic payment. Mobile electronic payment in local areas avoid that users are for example no longer requested to look up for their purse at a cash register at a supermarket. Hence, mobile electronic payment systems become of growing importance. Available mobile electronic payment systems may be for example based on one or more of the following computing and/or network technologies: SMS based transactional payments, in particular for a fixed amount of money, mobile web payments, and contactless Near Field Communications (NFC) which requires NFC-enabled mobile devices.

Problems that arise with regard to the above mentioned computing and/or computer network technologies for mobile electronic payment relate to transaction costs, inefficiency, inflexibility, and/or missing scalability of the mobile technology used, in particular due to the technical infrastructure including underlying hardware and/or software, a used mobile operator network, network connections to related entities such as payment institutes, additional software and/or hardware required by the user devices, additional software and/or hardware required by the mobile network operator. Further, it is desirable that possibly any mobile user can easily and in a flexible manner use a mobile electronic payment system simply via his user device.

Hence, there is a need to provide systems and methods for addressing the above problems to support efficient, flexible, and/or scalable computing and/or computer network technologies for use in mobile electronic payment.

According to one general aspect a communications network for providing a femtocell-based infrastructure for mobile electronic payment is provided. The network may comprise: a mobile operator network; a local area in the mobile operator network, wherein the local area is under coverage of at least one femtocell; and a femtocell-based payment system connected to the mobile operator network, wherein the femtocell-based payment system is operable to provide mobile electronic payment via a user device recognized by the at least one femtocell within the local area and notified by the femtocell-based payment system.

A mobile operator network may be a standard network such as D and E networks, 3G networks, LTE networks, WiFi networks provided by mobile network operators such as Vodafone, SFR, AT&T, Sprint Nextel, Verizon, Mobile TeleSystems, T-Mobile.

A local area in the mobile operator network may be an area which is under coverage of the mobile operator network and wherein at least one femtocell is plugged-in into the local area so that the local area is under the cellular coverage and capacity of the at least one femtocell. The femtocell relates to a small, low-power access point such as a cellular base station. In other words, the at least one femtocell is plugged-in into the local area and is connected to the mobile operator network. The at least one femtocell may provide extra coverage and/or capacity within the local area.

A femtocell-based payment system may be a software application developed and implemented for at least one femtocell. The femtocell-based payment system comprises one or more software components which comprise one or more interfaces to interact with other, existing software, hardware and/or network components. The femtocell-based payment system may also comprise one or more data storage devices for storing data required by the software components of the femtocell-based payment system. The software components of the femtocell-based payment system may comprise a one time code generator and/or a payment manager component.

The femtocell-based payment system is connected to a mobile operator network. For example, the femtocell-based payment system comprises at least one interface to interact, communicate, and/or exchange data with one or more (software, hardware, and/or network) components of the mobile operator network and/or hardware and/or software components connected to the mobile operator network.

Hardware and/or software components connected to the mobile operator network are herein after referred to as network-related systems. The network-related systems may comprise a mediation system, a network operator payment system and/or interfaces to financial institutes, an SMS centre, and/or an electronic register.

In connection to the mobile operator network and/or network-related systems, the femtocell-based payment system may provide and/or perform a mobile electronic payment. A mobile electronic payment may trigger an electronic transaction of an amount to be paid. The mobile electronic payment may comprise communication of electronic messages between a user device, the femtocell-based payment system, and/or an electronic register. The electronic messages may comprise a notification message, a transaction message, and/or a message communicated between the electronic register and the femtocell-based payment system.

A user device such as a mobile device including a mobile phone, a smart phone, a tablet can be recognized by at least one femtocell when the user device enters under coverage of the femtocell. The femtocell may recognize the user device by detecting presence of the user device under its coverage. The femtocell may communicate with the femtocell-based payment system to notify the femtocell-based payment system of the presence of a user device under its coverage. Being notified by the femtocell of the presence of a user device under coverage of the femtocell in the local area, the femtocell-based payment system communicates with the user device by notifying the user device that a mobile electronic payment can be performed using the femtocell-based payment system.

Advantageously, by providing mobile electronic payment using the femtocell-based payment system, drawbacks of existing technical solutions to electronic payment can be overcome. Compared with SMS based transactional payments, the transactions are not limited to a fixed amount of money. No additional hardware and/or software are required with the user device and/or the user of the local area. Mobile web payments may not be applied to local areas. Contactless Near Field Communications (NFC), which is basically developed for use within specific (local) areas, however, requires NFC-enabled user devices. Consequently, not a standard (non-NFC capable) user device can be used with NFC-based electronic payment, rather for NFC-based electronic payment NFC-capable devices are required. However, NFC-capable devices may be not as widespread used as non-NFC-capable devices so that NFC-capable devices might not have a comparable large number of possible users. The herein described mobile electronic payment can be performed with any standard user device. Further, NFC-based electronic payment may give raise to at least some security problems since transactions are performed in the near field and may be fraud by third parties. Further, even secured data on the user device may be fraud when another user device enters the near field. Such security problems do not arise with the herein described mobile electronic payment. Rather, the herein described mobile electronic payment allows for a high security since a unique one time code. Further, and contrary to the existing payment systems mentioned above, at no time in the process of the mobile electronic payment, neither secure data nor confidential data of the user of the user device (for example account data, credit card data, online banking data such as a tan, and/or other confidential data) are exchanged. Hence, the herein described femtocell-based payment system supports secure, efficient, flexible, and/or scalable computing and/or computer network technologies for use in mobile electronic payment. Further, it is possibly any mobile user can easily and in a flexible manner use mobile electronic payment simply via his user device. The femtocell-based payment system can be easily connected to any available mobile operator network.

According to an aspect, the femtocell-based payment system may comprise: a payment manager component operable to receive presence data regarding the user device via the at least one femtocell having recognized the user device, and upon receiving the presence data, to trigger the notification of the user device.

The femtocell may communicate with the femtocell-based payment system to notify the femtocell-based payment system of the presence of a user device under its coverage. The femtocell may communicate with the femtocell-based payment system by sending presence data of the user device to the femtocell-based payment system. The presence data unambiguously identify the user device and may comprise a telephone number of the user device with regard to a SIM card used with the user device. The presence data can be used by the femtocell-based payment system to communicate (e.g. via messages) with the user device. Hence, when the femtocell-based payment system has received the present data corresponding to the user device from the femtocell, the payment manager component of the femtocell-based payment system triggers a communication with the user device by notifying the user device that the mobile electronic payment can be performed using the femtocell-based payment system. In other words, upon receipt of the presence data at the femtocell-based payment system, the payment manager component may send a notification to the user device.

According to another aspect, the femtocell-based payment system may comprise: a one time code generator operable to generate a one time code for the mobile electronic payment, wherein the user device is notified by the femtocell-based payment system by receiving a notification message at the user device from the femtocell-based payment system, wherein the notification message comprises the generated one time code.

The notification message may be an SMS message and/or an email message received at the user device from the femtocell-based payment system.

The notification message sent to the user device form the femtocell-based payment system may comprise a one time code. The one time code may be generated by the one time code generator of the femtocell-based payment system. The one time code generator may be triggered to perform the one time code generation by the payment manager component after the payment manager component was notified of the presence of the user device by the femtocell.

The one time code may by a random number. The one time code generator may be a standard pseudo random number generator operable to generate random numbers. The one time code may comprise a short number of digits, e.g. 4 to 12 digits.

According to another general aspect, a computer system for providing a femtocell-based infrastructure for mobile electronic payment is provided. The system may comprise: a femtocell-based payment system connected to a mobile operator network, wherein the femtocell-based payment system is operable to provide mobile electronic payment via a user device recognized by at least one femtocell within a local area and notified by the femtocell-based payment system, wherein the local area is in the mobile operator network and is under coverage of the at least one femtocell.

According to an aspect, the femtocell-based payment system may comprise: a payment manager component operable to receive presence data regarding the user device via the at least one femtocell having recognized the user device, and upon receiving the presence data, trigger the notification of the user device.

According to another aspect, the femtocell-based payment system may comprise: a one time code generator operable to generate a one time code for the mobile electronic payment, wherein the user device is notified by the femtocell-based payment system by receiving a notification message at the user device from the femtocell-based payment system, wherein the notification message comprises the generated one time code.

According to yet another aspect, the mobile electronic payment may be performed by sending a transaction message from the user device to the femtocell-based payment system, wherein the transaction message comprises a one time code and a user pin.

Having received the one time code from the femtocell-based payment system at the user device and if the user of the user device wants to perform a transaction of an amount to be paid, the user performs the mobile electronic payment via the user device by sending a transaction message to the femtocell-based payment system.

The transaction message may be a SMS message and/or an email message sent from the user device to the femtocell-based payment system. The transaction message may be sent to the femtocell-based payment system via an electronic register connected to the femtocell-based payment system and identifying a transaction amount to be paid in the mobile electronic payment.

The transaction message may comprise the one time code and preferably also a user pin. The user pin may be a pin used to validate the SIM card used in the user device and/or a telephone number used with the SIM card in the user device. The transaction message may further comprise the transaction amount to be paid. The transaction amount may be communicated to the femtocell-based payment system from the user device and/or an electronic register in the local area.

According to yet another aspect, the one time code may be unique to the mobile electronic payment and may include a validity time for the mobile electronic payment.

The one time code may be unique. The one time code may be unique with regard to the mobile electronic payment. The one time code may be unique with regard to the local area, the user device, the mobile electronic payment, and/or a point and/or interval in time.

The one time code may comprise a validity time. The validity time may be a pre-defined time interval (e.g. 30 minutes, 1 hour, 5 minutes, 1 and a half hours, etc.) and/or a period corresponding to a time period the user device is under coverage of the femtocell. The validity time may be specified in terms of a finite interval of seconds and stored with the one time code in the femtocell-based payment system.

According to yet another aspect, the system may further comprise: an electronic register connected to the femtocell-based payment system, wherein the electronic register is operable to communicate a transaction amount for the mobile electronic payment to the femtocell-based payment system and to notify, via the user device, a user of the user device on the transaction amount for the mobile electronic payment.

The electronic register may be a cash register having an electronic connection (e.g. in terms of an interface) for communicating messages to and from the femtocell-based payment system.

The electronic register may be further operable to communicate with the user device. For communication with the user device, the electronic register may comprise a standard connection for example for sending and receiving SMS messages.

The electronic register is operable to communicate a transaction amount relating to the mobile electronic payment to the femtocell-based payment system and/or to the user device. The transaction amount may relate to an amount to be paid. The user device may be thus notified about the transaction amount of the mobile electronic payment.

According to yet another general aspect, a computer-implemented method for providing a femtocell-based infrastructure for mobile electronic payment is provided. The method may comprise: connecting a femtocell-based payment system to a mobile operator network; and performing mobile electronic payment via a user device recognized by at least one femtocell within a local area and notified by the femtocell-based payment system, wherein the local area is in the mobile operator network and is under coverage of the at least one femtocell.

According to an aspect, the method may further comprise: receiving presence data regarding the user device via the at least one femtocell having recognized the user device; and upon receiving the presence data, triggering the notification of the user device.

According to another aspect, the method may further comprise: generating a one time code for the mobile electronic payment; and notifying the user device by the femtocell-based payment system by receiving a notification message at the user device from the femtocell-based payment system, wherein the notification message comprises the generated one time code.

According to yet another aspect, the method may further comprise: performing the mobile electronic payment by sending a transaction message from the user device to the femtocell-based payment system, wherein the transaction message comprises a one time code and a user pin.

According to yet another aspect, the one time code may be unique to the mobile electronic payment and may include a validity time for the mobile electronic payment.

In another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in or a non-transitory computer readable medium and/or information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

DETAILED DESCRIPTION OF EMBODIMENTS

In the following, a detailed description of examples will be given with reference to the drawings. It should be understood that various modifications to the examples may be made. In particular, elements of one example may be combined and used in other examples to form new examples.

The present application generally describes computing and network technologies that enable mobile electronic payment. The computing and network technologies operate on femtocell-based technologies, particularly, the ability to specify and implement femtocell-based applications. Mobile electronic payment based on femtocell-based technologies is referred to hereinafter as a femtocell-payment. The hereinafter described computing technologies for femtocell-payment provide an efficient, scalable, and flexible way to enable electronic mobile payments. Femtocell-payment requires only a small amount of additional hardware and/or software and is available to any user of a user device such as a mobile device.

Femtocell-payment is operable to exploit identification and/or localization capabilities of femtocells to propose a user of a (mobile) user device electronically entering a local area such as a restaurant, a shop, a supermarket, a gas station, a local event area, etc. a new way of electronic mobile payment.

Femtocell-based payment may be provided through mobile networks of the corresponding network operators and/or mobile network operators, wherein femtocell-based payment can be offered as an application (in particular, a femtocell-based application) to users on their user devices. Femtocell-based payment may be defined and/or built by the mobile network operators, wherein existing electronic infrastructure including call control and/or billing systems of the mobile network operator, existing electronic payment processes of the mobile network operator and/or existing software and/or hardware interfaces with external entities (e.g. financial institutes) can be used.

Hence, femtocell-based payment allows for reuse of existing network and/or communications infrastructure with little need for new hardware, the reuse of existing and/or consolidated interfaces and/or processes. Further, each user device, which is installed with a femtocell is operable to operate on the femtocell-based payment system for mobile payment, for example in a supermarket and/or any entity which supports electronic payment using any (mobile) user device.

Figure 1:
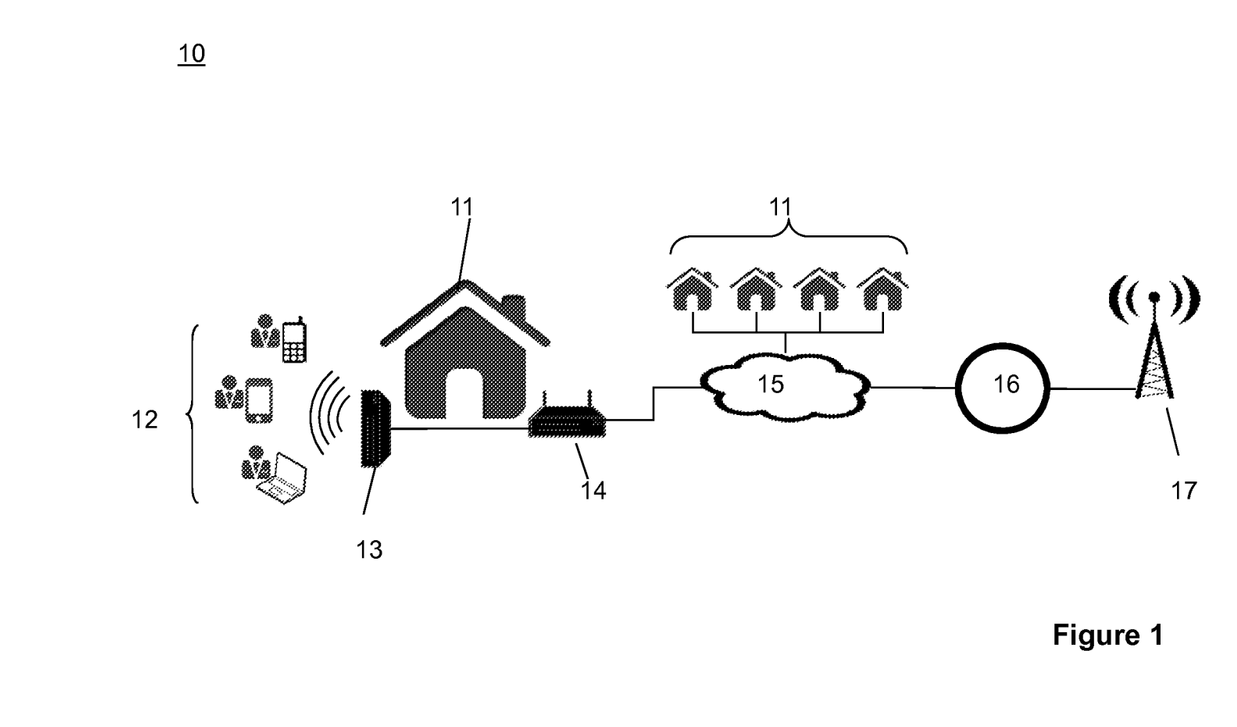
FIG. 1 shows an exemplary femtocell-based communications network.

FIG. 1 shows an exemplary communications network 10 comprising at least one femtocell 13. The network 10 may be operated by a mobile network operator such as Vodafone, SFR, AT&T, Sprint Nextel, Verizon, Mobile TeleSystems, T-Mobile. In the network 10, a mobile network operator provides the corresponding mobile operator network 16 through high power cellular base stations (also referred to as macrocell base stations or stowers) 17 for Internet access 15 to a plurality of local areas 11 such as a home, an enterprise, metropolitan and/or rural public spaces.

Within a local area 11, at least one user may connect through a user device 12 to a femtocell 13. Examples of user devices may include mobile devices such as mobile phones, smart phones, notebooks, tablets, etc. The femtocell 13 access point provides greater network functionality (e.g. radio resource control function) than found in macrocell base stations (e.g. 17). The femtocell 13 therefore enables greater autonomy including self-configuration and/or self-optimization. The femtocell 13 is connected to the network operator's towers 17 using broadband IP such as a broadband router 14 (e.g. DSL, a cable modem, WiFi). In other words, the femtocell 13 requires a specific hardware so that existing WiFi and/or DSL routers 14 may not be upgraded to a femtocell 13. Femtocells 13 may be sold by a mobile network operator to users. Integrated femtocells, which may include both a broadband router 14 and a femtocell 13, may be also used.

Once plugged in into a local area of a network 10, the femtocell 13 may connect to the mobile operator network 16 and provides extra coverage and/or capacity. From a user's perspective, it is plug-and-play there is no specific installation and/or technical knowledge required so that anyone can install a femtocell 13 in a specific local area 11. The femtocell 13 may comprise a web interface (not shown) provided by the mobile network operator of the mobile operator network 16. The web interface may support registration of phone numbers to the femtocell 13, access to and/or deployment of femtocell-based applications provided by the mobile network operator, for example.

Several femtocell-based applications which may be provided by a mobile network operator and/or by a third party offering applications to a mobile network operator are available. Example femtocell-based applications may comprise personalized content pushing, device management, virtual home number management, and/or smart home services such as a home security, virtual fridge notes, virtual home phones. Femtocell-based applications may be provided through a web interface of a femtocell 13 interacting with one or more user devices 12 of the user.

Within personalized content pushing, for example, each time a user, operating a registered user device 12, enters his home, specific content is pushed according to the user's profile and/or preferences specified in the corresponding femtocell-based application. Eventually, the user may be directed to the online store, to buy premium content. Examples may comprise TV guide and recommendation, news, horoscope, and/or personal reminders. For example, a user may access a web portal through a registered user device 12 in order to select and/or edit data that the user wishes to receive when arrived at home and/or the user may receive data which redirects to online stores, for example.

Within a device management femtocell-based application, a user may configure configuration profiles for his user devices 12, which are automatically enabled depending on the user's location. The user may configure his own settings for each femtocell 13 he is registered to, wherein each time the user may enter a specific femtocell 13 (e.g. home, office, theatre), a device manager application may configure the user device 12 according to the user settings such as ringtone, sound volume, themes, APN, proxy, bookmarks, predefined home page, etc. Further services (e.g. automatic synchronization of contact lists when entering, calendars, and/or backup of multimedia) may be also supported by such a femtocell-based application.

Within a virtual home number femtocell-based application based on the user location, the femtocell-based application calls to a registered user device 12 to be routed, following user's preferences. For example, calls to the user's mobile phone 12 when the user is at home can be automatically redirected to the user's landline. In another example, calls to the user's landline when the user is not at home may be redirected to his mobile phone 12 and/or to a voicemail service 12.

Within a smart home femtocell-based application, the application may support for example, automatically turning off all the lights when nobody is at home, a family locator and/or family alerts, mobile device remote control.

Another example of a femtocell-based application is a femtocell-based payment system for electronic mobile payment as described in greater detail below with reference to FIGS. 2 and 3.

Femtocell-based applications may reside in a user device 12 registered with a femtocell 13, on the femtocell's 13 access point, on a local LAN, in the mobile operator network 16 including a femtocell gateway, an application server, an application cloud, and/or the Internet.

Figure 2:
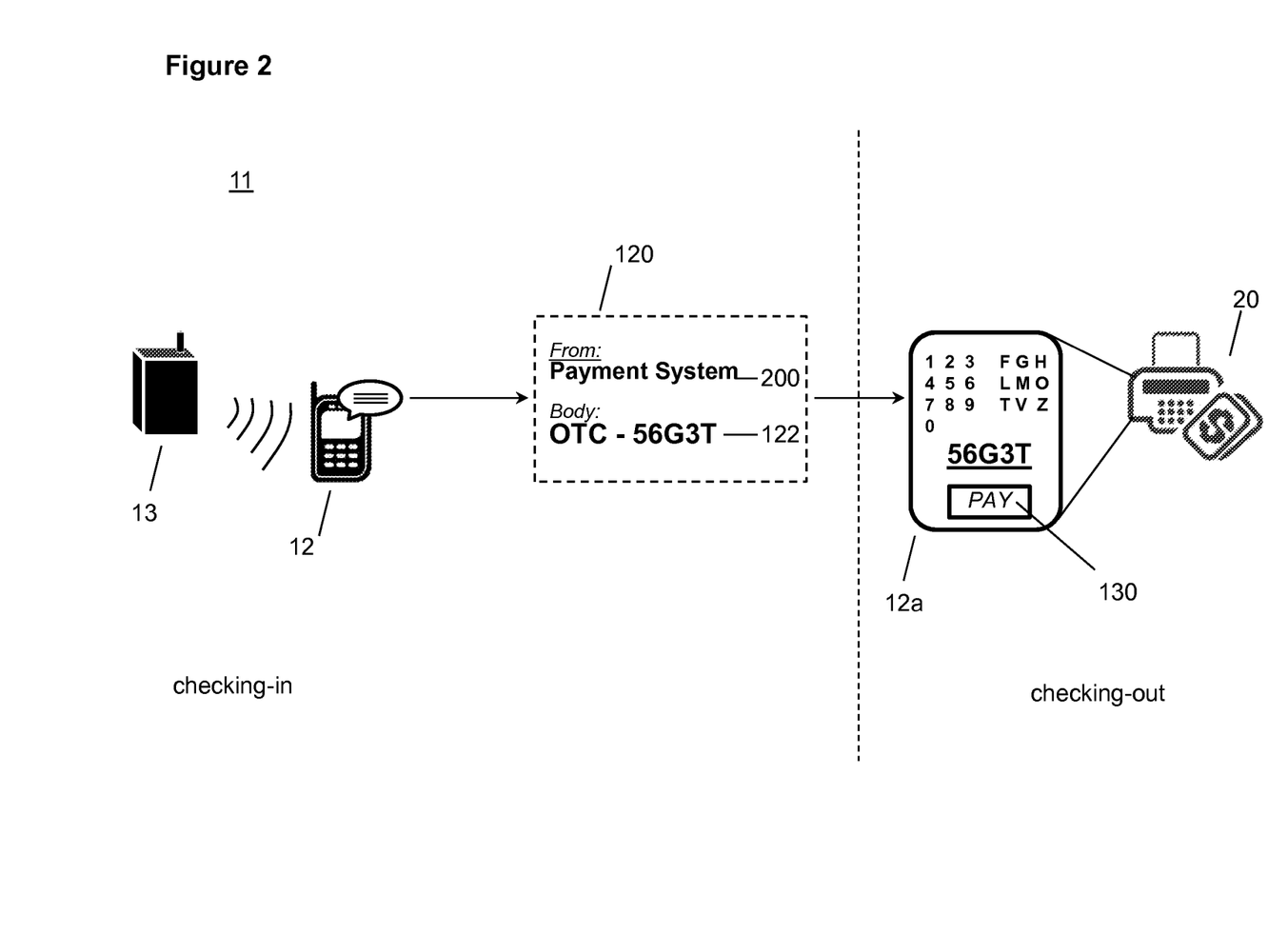
FIG. 2 shows an exemplary local area with mobile network technology for mobile electronic payment.

FIG. 2 shows a local area 11 such as a home, a shop, a supermarket, a gas station, a restaurant, a local event area. The local area 11 specifies network technologies which are based on femtocells 13 and which can be used for providing mobile electronic payment to any user of a user device 12 (e.g. a mobile device 12 such as a mobile phone, a tablet, a notebook, a smartphone).

Mobile electronic payment may relate to an electronic process of communicating and/or transferring data between different computing components in the local area 11 and/or a mobile operator network 16 comprising the local area, wherein the data relate to data to uniquely identify the local area 11, a user, the user device 12, a femtocell 13, and/or an electronic register 20 involved in the mobile electronic payment in order to electronically pay a specified transaction amount in the mobile electronic transaction. Mobile electronic payment may be also referred to as a payment transaction and may specify an electronic payment process via a user device 12 under coverage of a femtocell 13 in a specific local area 11, wherein the femtocell 13 is registered and/or installed with a femtocell-based payment system and/or application 200.

The femtocell-based payment system 200 may be integrated with an existing mobile operator network the user device 12 is registered with. Said integration may comprise at least one interface of the femtocell-based payment application 200 to one or more components and/or interfaces of the mobile operator network so as to perform the mobile electronic payment. The femtocell-based payment system 200 can be implemented as a femtocell-based application and may be provided through the mobile operator network of the mobile network operator. The femtocell-based payment system 200 is described in greater detail below with reference to FIG. 3.

The user device 12 comprises a user interface 12a. The user interface 12a may be any available, possibly graphical, user interface 12 of an available user device 12 such as a touch screen 12a of a smartphone and/or a tablet. The user interface 12a may comprise a dial pad as available with any mobile phone and/or smartphone.

The local area 11 comprises at least one femtocell 13 and an electronic register 20.

The electronic register 20 may be an available cash register 20 with an electronic interface modified to (wirelessly) connect to the femtocell-based payment system 200. In an alternative example, the electronic register 20 may be provided by a mobile network operator of the mobile operator network to the local area 11 and comprises an interface for connection to the femtocell-based payment system 200. The electronic register 20 may be operable to (wirelessly) communicate (e.g. in an electronic message) a transaction amount (also referred to as an amount to be paid) for the corresponding mobile electronic payment to the corresponding user device 12 and/or the femtocell-based payment system 200. The electronic register 20 may communicate with the user device 12 in the local area 11 since both devices 12, 20 are under coverage of the femtocell 13.

When a user of a user device 12 is entering the local area 11, the femtocell 13 automatically identifies and/or recognizes entry of the user device 12 under coverage of the femtocell 13. In response to the recognition of the user device 12 in the local area 11, the femtocell 13, which interacts through the mobile operator network of a mobile network operator with the femtocell-based payment system 200, sends a notification to the femtocell-based payment system 200 to notify presence of the user device 12. The notification may comprise corresponding presence data of the user device 12. The presence data may comprise a telephone number registered with the SIM card used in the user device 12 in the mobile operator network.

Having received the notification at the femtocell-based payment system 200, the femtocell-based payment system 200 sends a notification message (e.g. an SMS, an email) 120 to the user device 12, to notify the user of the user device 12 about the possibility of a mobile electronic payment in the local area 11.

The notification message 120 received from the femtocell-based payment system 200 at the user device 12 comprises a one time code 122. The one time code 122 is unique. The one time code 122 is a random access number generated by the femtocell-based payment system 200. The one time code 122 may comprise a validity time (e.g. a pre-defined time interval specified in terms of a finite discrete interval of seconds, a period corresponding to the time interval the user device 12 is under coverage of the femtocell 13). The one time code 122 may comprise a small number of digits (e.g. less then twelve digits but at least 4 digits, preferably 6 digits).

In order to pay within the local area 11, i.e. to perform the mobile electronic payment, the user is shown a total amount to be paid (also referred to as transaction amount) through the electronic register 20, for example on the user interface 12a of his user device 12 and/or on a display of the electronic register 20. In order to pay the transaction amount displayed through the electronic register 20, the user enters through the user interface 12a of the user device 12 his user pin of the SIM card used with the user device 12, the telephone number of a SIM-card used with the user device 12 and/or the received one time code 122 to generate a transaction message 130. The transaction message 130 can be sent to the femtocell-based payment system 200, for example as an SMS and/or email message.

The femtocell-based payment system 200 receives said transaction data including the user pin, the telephone number the one time code 122 and/or the transaction amount in the transaction message 130 and/or in communication with (e.g. through a specified interface) the electronic register. Said transaction data (including the user pin, the one time code, the telephone number, and/or the transaction amount) may be received via the electronic register 20 and/or directly from the user device 12 under coverage of the femtocell 13. The femtocell-based payment system 200 verifies the received transaction data corresponding to the performed mobile electronic payment.

In case the verification succeeds, the transaction amount is charged from the user and credited to the service provider of the local area 12. This can be done through the network operator payment system of the mobile network operator since the femtocell-based payment system 200 is integrated with the mobile operator network of said operator.

In case the verification fails, the user is accordingly informed through the user interface 12a of his user device 12 from the femtocell-based payment system 200, for example by receiving a corresponding message.

Figure 3:
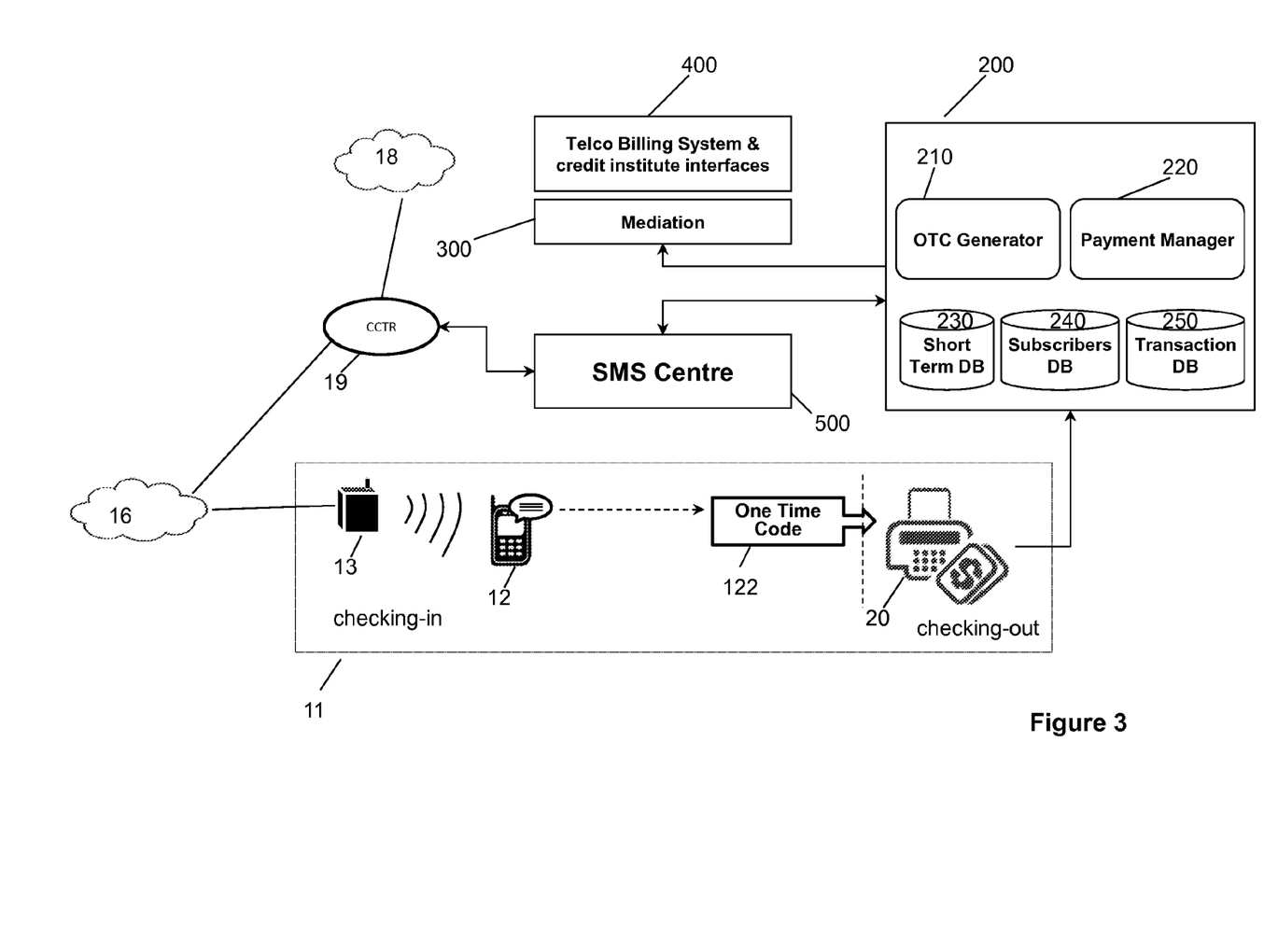
FIG. 3 shows the local area of FIG. 2 connected with a mobile communications network with an integrated computer system for mobile electronic payment.

FIG. 3 shows an exemplary communications network integrating a femtocell-based payment system 200 with a mobile operator network 16. The femtocell-based payment system 200 may be implemented with one or more femtocells 13 in one or more local areas 11. The femtocell-based payment system 200 may interact and/or communicate with one or more related systems 300, 400, 500 and/or networks 16, 18, 19 of mobile communications network through a mobile operator network 16.

The mobile operator network 16, which interacts with at least one femtocell 13, connects to a presence concentrator 19 and/or a public switched telephone network 18 used by the mobile network operator of the mobile operator network 16.

The femtocell-based payment system 200 is connected to the mobile operator network 16. The femtocell-based payment system 200 may be connected to an available standard SMS centre 500 operated to distribute electronic messages between user devices 12. The SMS centre 500 communicates with a femtocell 13 through the presence concentrator 19. Since the femtocell-based payment system 200 may be connected to the SMS centre 500, the femtocell-based payment system 200 may use services provided by the presence concentrator 19 for notification of presence of a user device 12 under coverage of a femtocell 13 in a specific local area 11. For example, a femtocell 13 recognizes a user device 12 under its coverage and can, due to the connection via the presence concentrator 19 and/or the SMS centre 500 communicate the corresponding presence data of the user device 12 to the femtocell-based payment system 200.

The femtocell-based payment system 200 is connected to a mediation system 300 mediating with a network operator payment system 400 connected with the mobile network operator of the mobile operator network 16. The network operator payment system 400 can be interfaced to financial institutes to achieve a final payment of a transaction amount specified with a mobile electronic payment through the femtocell-based payment system 200.

The femtocell-based payment system 200 may be connected to the mobile operator network 16 through at least one interface. The femtocell-based payment system 200 may be developed as a femtocell-based application for one or more femtocells 13 providing coverage in one or more local areas 11.

The femtocell-based payment system 200 is basically operable to provide mobile electronic payment via a user device 12 recognized by at least one femtocell 13 within a local area 11 and notified by the femtocell-based payment system 200. The mobile electronic payment may comprise process steps of notifying entrance of the user device 12 into the local area 11 under coverage of a femtocell 13, generating a corresponding one time code 122, sending a notification message 120 comprising the generated one time code 122 to the user device 12, verifying transaction data (including a telephone number of a SIM card used with the user device 12, a user pin used with the SIM card of the user device 12, a one time code generated for the mobile electronic payment by the femtocell-based payment system 200, and/or a transaction amount to be paid) received from the user device 12, storing the transaction amount, and/or forwarding the transaction amount and corresponding user data of the user of the user device 12 to the mediation system 300 interacting with the network operator payment system 400.

Payment of the transaction amount may be performed in real time and/or periodically. The paying process merely requires a change to the configuration of the mediation system 300 for an interface of the femtocell-based payment system 200. The mediation system 300 is operable to gather data relevant for a mobile electronic payment in the mobile operator network 16. In an implementation, the mediation system 300 is operable to retrieve the corresponding transaction data relating to a mobile electronic payment from the payment management component 220. Said transaction data can be stored in the transaction storage device 250. The transaction data may be retrieved at the mediation system 300 in real time (i.e. whenever a payment transaction is performed by a user through a user device 12 under coverage of a registered femtocell 13) and/or periodically.

The femtocell-based payment system 200 can be exploited as a femtocell-based application into the mobile operator network 16. The femtocell-based payment system 200 can be operated by one or more femtocells 13 in one or more local areas 11, wherein a corresponding femtocell 13 needs to be once installed with the femtocell-based payment system 200.

The femtocell-based payment system 200 comprises a one time code generator 210 and/or a payment manager component 220. The femtocell-based payment system 200 may further comprise one or more data storage devices 230, 240, 250 storing data relating to users, user devices 12, femtocells 13, electronic registers 20, and/or operations performed by the mentioned components in a local area 11 of a femtocell 13. The data storage devices 230, 240, 250 may be implemented as database management systems and may comprise a short term data storage device 230, a subscribers data storage device 240, and/or a transaction data storage device 250.

The payment manager component 220 may be implemented as a workflow manager component. The payment manager component 220 starts (and/or triggers) a mobile electronic payment as also described above with reference to FIG. 2 when triggered by a notification comprising presence data of a user device 12 being recognized and/or identified by a femtocell 13. The femtocell 13 may be installed and/or registered with the femtocell-based payment system 200. The process managed by the process manager component 200 ends when the corresponding mobile electronic payment is committed and/or when a validity time of the corresponding one time code 122 is expired.

In one example, users can subscribe with their user devices 12 to the femtocell-based payment system 200. In case a user has subscribed to the femtocell-based payment system 200 with his user device 12, the payment manager component 220 is operable to check the MSISDN (i.e. the telephone number corresponding to the SIM card used with the user device 12 recognized by the femtocell 13) against corresponding data in the subscribers data storage device 240 to verify that the user of the user device 12 wants to use the femtocell-based payment system 200.

The payment manager component is operable to collect data from the mobile operator network 16. The data may comprise a unique identifier (ID) of the local area 11 comprising the femtocell 13 and/or the MSISDN of the user of the user device 12. In case the user performs a mobile electronic payment, the payment manager component 220 may retrieve the transaction amount from the electronic register 20 and/or the electronic register 20 may send the transaction amount to the payment manager component 220. The payment manager component 220 is operable to interact with the mediation system 300 to complete the mobile electronic payment in case the transaction data are verified by triggering transfer of the transaction amount from the user of the user device 12 to a user of the local area 11.

The one time code generator 210 is triggered by the payment management component 220. In case the payment management component 220 performs a mobile electronic payment initiated by a user device 12 recognized under coverage of the femtocell 13 in the local area 11, the payment management component 220 triggers the one time code generator 210 to generate a one time code 122 for said user device 12 with a validity time for the corresponding mobile electronic payment. The one time code generator 210 may comprise a standard pseudo random number generator. A generated one time code 122 may be unique at a given point in time in a given local area 11 under coverage of a given at least one femtocell 13 and/or for a specific user device 12. To generate a unique one time code 122, the one time code generator 210 receives from the payment management component 220 the unique identifier (ID) of the local area 11 when the generation of a corresponding one time code 122 is triggered for a recognized user device 12.

The subscribers data storage device 240 stores the MSISDN of users having registered with the femtocell-based payment system 200. Each MSISDN may be stored with a corresponding user and a corresponding user pin (e.g. the PIN of the corresponding SIM card used with the user device).

The short term data storage device 230 stores for each local area 12 of a femtocell 13 installed with the payment application 200 a unique identifier (ID) of the corresponding local area 11 and/or generated one time codes 122 with a corresponding validity time, for example in seconds.

The transaction data storage device 250 stores data relating to one or more completed payment transactions ready to be sent to the mediation system 300 upon request.

The femtocell 13 is operable to detect a user device 12 under its 13 coverage in the corresponding local area 11. The femtocell 13 is operable to communication this information to the femtocell-based payment system 200 for triggering the payment manager component 220. This may be established by communication of the femtocell 13 in the mobile operator network 16 by notifying a presence concentrator 19 of in the communications network. The presence concentrator 19 may interact with the SMS centre 500 interfaced to the femtocell-based payment system 200. The presence concentrator 19 may be a standard network component operable to gather presence information from femtocells 13 and/or to provide the gather information to the SMS centre 500. In one implementation, the payment manager component 220 may subscribe to the presence concentrator 19 to get notified on any user device 12 entering under coverage of a femtocell 13 registered with the femtocell-based payment system 200 by looking up unique IDs of corresponding local areas 11 stored in the data storage devices 230, 240, 250.

One or more technical improvements to the system and method as described above with reference to FIGS. 2 and 3 may be implemented.

For an improved security, the user of the user device 12 entering under coverage of a registered femtocell 13 in a local area 11 may receive rather than a single notification message 120 with the one time code 122, a first notification message comprising hint to the option of femtocell-based payment and a second notification message comprising the one time code only. The second notification message may be received at the user device 12 when the user wants to perform mobile electronic payment using the femtocell-based payment system 200, so that the corresponding one time code is read only at the time of payment.

The notification message 120 may be sent to each user device 12 being detected under coverage of a femtocell 13 registered with the payment system 200. In another implementation, the notification message 120 may be sent to user devices 12 of users who have previously registered and/or subscribed to the payment system 200. A user may subscribe and/or register with the femtocell-based payment system 200 via a web interface provided by the mobile network operator and/or by sending a message to a configured number of the mobile network operator to deliver the message to the payment manager component 220 of the femtocell-based payment system 200 for storage of the corresponding MSISDN of the user device 12 in the subscribers data storage device 240.

In case a received one time code 122 expires before the corresponding user performs and/or finishes a mobile electronic payment via the femtocell-based payment system 200, the user may request from his user device 12 a new one time code 122 by sending a message to a configured number of the mobile network operator. The message can be delivered to the payment manager component 220 in order to restart the process described above with reference to FIGS. 2 and/or 3.

Figure 4:
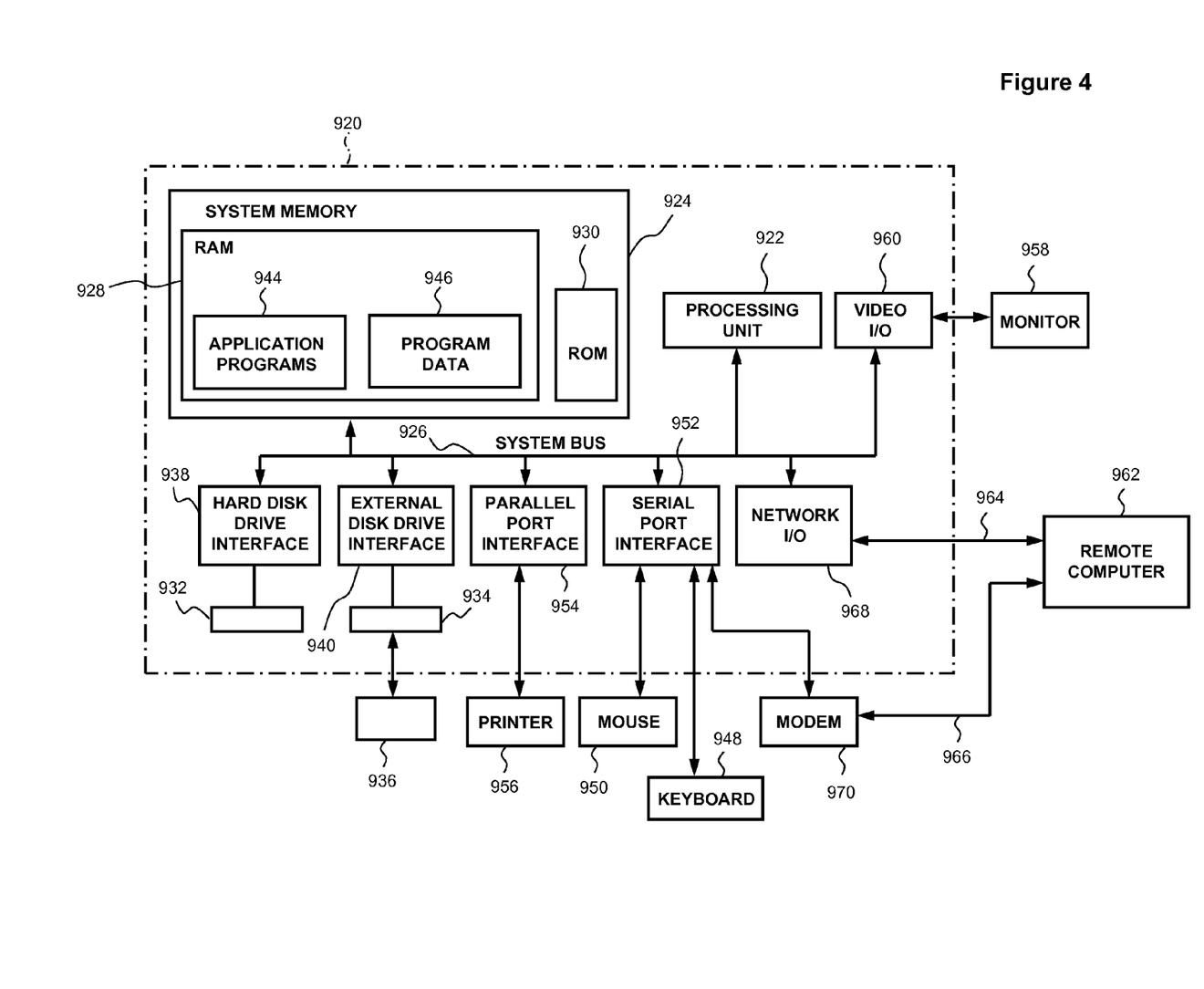
FIG. 4 shows an exemplary computer system and/or computer network system for implementing a computer network, a computer system, and a computer-implemented method as shown in FIGS. 1 to 3.

FIG. 4 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide non-volatile storage of computer readable instructions, data structures, program modules and other data for the personal computer 920. The data structures may include relevant data for the implementation of the method for providing a femtocell-based infrastructure for mobile electronic payment, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1 to 3.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB). Further, information may be printed using printer 956. The printer 956 and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 4 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 4 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for providing a femtocell-based infrastructure for mobile electronic payment.

What is claimed is:

1. A communications network for providing a femtocell-based infrastructure for mobile electronic payment, the network comprising:
 a femtocell-based payment system;
 a mobile network comprising:
  a femtocell access point associated with a local area in the mobile network;

wherein the femtocell access point is to recognize entry of a user device in the local area and send a presence notification to the femtocell-based payment system, the presence notification indicating a presence of the user device within the local area; and in response to receiving the presence notification, the femtocell-based payment system is to send a message to the user device indicating availability of mobile electronic payment in the local area; and an electronic register in communication with the user device, wherein the electronic register is to communicate a transaction amount for the mobile electronic payment to the user device, wherein the femtocell-based payment system comprises a one time code generator operable to generate a one time code for the mobile electronic payment, and wherein the one time code is a one time code unique to the mobile electronic payment and includes a validity time for the mobile electronic payment during which the user device is under coverage of the femtocell access point.

2. The communications network according to claim 1, wherein the femtocell-based payment system comprises:

a payment manager component, wherein the payment manager component is to receive the presence notification from the femtocell access point, wherein the presence notification comprises presence data of the user device including a telephone number associated with the user device, and wherein the payment manager component is to trigger the sending of the message to the user device in response to receiving the presence data.

3. The communications network according to claim 1, wherein the user device is notified by the femtocell-based payment system by receiving a notification message at the user device from the femtocell-based payment system, wherein the notification message comprises the generated one time code.

4. A computer system for providing a femtocell-based infrastructure for mobile electronic payment by a user device, the system comprising:

a femtocell-based payment system connected to a mobile network; and an electronic register in communication with the user device, wherein the femtocell-based payment system comprises:
a processor; and
a memory storing machine readable instructions that when executed by the processor cause the processor to:
receive presence data from a femtocell access point indicating entry of the user device within a local area under coverage of the femtocell access point;
in response to receiving the presence data, send a message to the user device indicating availability of mobile electronic payment in the local area; and
generate a one time code for the mobile electronic payment, wherein the one time code is a one time code unique to the mobile electronic payment and includes a validity time for the mobile electronic payment during which the user device is under coverage of the femtocell access point, and wherein the electronic register is to communicate a transaction amount for the mobile electronic payment to the user device.

5. The computer system according to claim 4, wherein the femtocell-based payment system comprises:

a payment manager component, wherein the payment manager component is to receive the presence notification from the femtocell access point, wherein the presence notification comprises presence data of the user device including a telephone number associated with the user device, and wherein the payment manager component is to trigger the sending of the message to the user device in response to receiving the presence data.

6. The computer system according to claim 4, wherein the femtocell-based payment system comprises:

a one time code generator operable to generate the one time code for the mobile electronic payment, wherein the user device is notified by the femtocell-based payment system by receiving a notification message at the user device from the femtocell-based payment system, wherein the notification message comprises the generated one time code.

7. The computer system according to claim 4, wherein the mobile electronic payment is performed by sending a transaction message from the user device to the femtocell-based payment system, wherein the transaction message comprises the one time code and a user pin to validate a telephone number associated with the user device.

8. The computer system according to claim 6, wherein the one time code is a one-time code unique to the local area under coverage of the femtocell access point.

9. The computer system according to claim 4, wherein the electronic register is connected to the femtocell-based payment system, wherein the electronic register is to communicate a transaction amount for the mobile electronic payment to the femtocell-based payment system.

10. A computer-implemented method for providing a femtocell-based infrastructure for mobile electronic payment, the method comprising:

receiving, by a hardware processor, presence data from a femtocell access point indicating entry of a user device within a local area under coverage of the femtocell access point;

sending, in response to receiving the presence data, a message to the user device indicating availability of mobile electronic payment in the local area;

generating a one time code for mobile electronic payment, wherein the one time code is a one time code unique to the mobile electronic payment and includes a validity time for the mobile electronic payment during which the user device is under coverage of the femtocell access point;

performing the mobile electronic payment via the user device, an electronic register in communication with the user device, and the femtocell access point; and communicating, by the electronic register, a transaction amount for the mobile electronic payment to the user device.

11. The computer-implemented method according to claim 10, wherein receiving presence data comprises receiving a telephone number associated with the user device.

12. The computer implemented method according to claim 10, wherein sending the message to the user device indicating availability of mobile electronic payment in the local area comprises sending the generated one time code.

13. The computer-implemented method according to claim 10, the method further comprising:

performing the mobile electronic payment by sending a transaction message from the user device to a femtocell-based payment system, wherein the transaction message comprises the one time code and a user pin.

14. A non-transitory computer readable medium comprising computer readable instructions, which when executed by a computer system, causes the computer system to:
  receive, from a femtocell access point, presence data indicating entry of a user device within a local area under coverage of the femtocell access point;
  send, in response to receiving the presence data, a message to the user device indicating availability of mobile electronic payment in the local area; and
  generate a one time code for mobile electronic payment, wherein the one time code is a one time code unique to the mobile electronic payment and includes a validity time for the mobile electronic payment during which the user device is under coverage of the femtocell access point;
  perform the mobile electronic payment via the user device, an electronic register in communication with the user device, and the femtocell access point; and
  communicate, from the electronic register to the user device, a transaction amount for the mobile electronic payment.

15. The non-transitory computer readable medium according to claim 14, wherein receiving the presence data comprises receiving a telephone number associated with the user device.

16. The non-transitory computer readable medium according to claim 14, wherein to send, in response to receiving the presence data, the message to the user device indicating availability of mobile electronic payment in the local area, the computer system is to send the generated one time code.

17. The non-transitory computer readable medium according to claim 14, wherein the computer readable instructions cause the computer system to:
  perform the mobile electronic payment by sending a transaction message from the user device to a femtocell-based payment system, wherein the transaction message comprises the one time code and a user pin.

18. The communications network according to claim 1, wherein the one time code generator is operable to generate
  a first notification including a hint to an option of femtocell-based payment, and
  a second notification including the one time code for the mobile electronic payment, wherein the user device is notified by the femtocell-based payment system by receiving the first notification at the user device from the femtocell-based payment system, and upon approval by the user device of the femtocell-based payment, the user device is notified, at a time of the mobile electronic payment, by the femtocell-based payment system by receiving the second notification including the one time code for the mobile electronic payment.

* * * * *

UNITED STATES PATENT AND TRADEMARK OFFICE
CERTIFICATE OF CORRECTION

PATENT NO. : 10,007,902 B2
APPLICATION NO. : 14/172303
DATED : June 26, 2018
INVENTOR(S) : Capuozzo et al.

Page 1 of 1

It is certified that error appears in the above-identified patent and that said Letters Patent is hereby corrected as shown below:

On the Title Page

At Item (30), Foreign Application Priority Data "13425028" should be "13425028.1".

Signed and Sealed this
Twenty-first Day of August, 2018

Andrei Iancu
*Director of the United States Patent and Trademark Office*